United States Patent [19]

Worthington et al.

[11] Patent Number: 4,588,573
[45] Date of Patent: May 13, 1986

[54] METHOD FOR THE PRODUCTION OF POTASSIUM SULFATE USING SULFURIC ACID AND POTASSIUM CHLORIDE

[75] Inventors: Ralph E. Worthington, Winter Haven; Alex Magdics; Donald B. Stain, both of Lakeland, all of Fla.

[73] Assignee: Prodeco, Inc., Mulberry, Fla.

[21] Appl. No.: 602,036

[22] Filed: Apr. 19, 1984

Related U.S. Application Data

[63] Continuation-in-part of Ser. No. 536,378, Sep. 27, 1983, Pat. No. 4,554,151.

[51] Int. Cl.⁴ .................. C01D 15/06; C01B 7/01
[52] U.S. Cl. ........................ 423/552; 423/482; 423/520
[58] Field of Search ............. 423/191, 193, 166, 205, 423/299, 520, 551, 552, 554, 482; 23/298, 300, 302 R, 303

[56] References Cited

U.S. PATENT DOCUMENTS

| | | | |
|---|---|---|---|
| 2,689,041 | 9/1954 | Dancy | 423/166 |
| 2,788,257 | 4/1957 | Duke | 23/302 |
| 3,348,913 | 10/1967 | Veronica | 423/552 |
| 3,402,018 | 9/1968 | Waters | 423/552 |
| 3,998,935 | 12/1976 | Adams | 423/552 |
| 4,045,543 | 8/1977 | Sardisco | 423/482 |
| 4,215,100 | 7/1980 | Sokolov et al. | 423/552 |
| 4,342,737 | 8/1982 | Iwashita et al. | 423/482 |

FOREIGN PATENT DOCUMENTS

| | | | |
|---|---|---|---|
| 1902738 | 9/1970 | Fed. Rep. of Germany | 423/552 |
| 787713 | 9/1935 | France | |
| 1310550 | 9/1961 | France | 423/552 |
| 435772 | 9/1935 | United Kingdom | |
| 2068918 | 8/1981 | United Kingdom | |
| 558855 | 9/1977 | U.S.S.R. | 423/551 |
| 806605 | 2/1981 | U.S.S.R. | 423/191 |

Primary Examiner—Gary P. Straub
Attorney, Agent, or Firm—Fleit, Jacobson, Cohn & Price

[57] ABSTRACT

Potassium chloride and sulfuric acid are reacted in a recycled aqueous solution in the stoichiometric ratio required for potassium sulfate production. Hydrogen chloride produced by the reaction of the potassium chloride and sulfuric acid is evaporated in admixture with water or in anhdrous form. The resulting solution is cooled to crystallize a potassium sulfate salt, preferably potassium bisulfate. The potassium sulfate salt is separated from the mother liquor and the mother liquor is recycled to the reaction step. The potassium sulfate salt is dissolved in an aqueous solution and sequentially decomposed to produce potassium sulfate and a mother liquor rich in sulfuric acid. The mother liquor rich in sulfuric acid is concentrated and recycled to the reaction step.

10 Claims, 3 Drawing Figures

K₂SO₄/H₂SO₄/H₂O PHASE DIAGRAM
30°C

K₂SO₄/H₂SO₄/H₂O PHASE DIAGRAM
50°C

METHOD FOR THE PRODUCTION OF POTASSIUM SULFATE USING SULFURIC ACID AND POTASSIUM CHLORIDE

CROSS-REFERENCE TO RELATED APPLICATION

This application is a continuation-in-part of Ser. No. 536,378, filed Sept. 27, 1983, now U.S. Pat. No. 4,554,151.

BACKGROUND OF THE INVENTION

The current methods for producing potassium sulfate start with sulfuric acid and use either a high temperature reaction of potassium chloride with concentrated sulfuric acid, or use solvent extraction techniques to remove hydrochloric acid from the solution in methods in which potassium chloride and aqueous sulfuric acid are reacted.

U.S. Pat. Nos. 3,998,935 and 4,045,543 disclose the reaction of potassium chloride, directly or indirectly, with sulfuric acid in suitable solutions to produce potassium sulfate. In the first U.S. Pat. No., 3,998,935, the potassium chloride is reacted with a hot solution of potassium bisulfate to produce potassium sulfate which is recovered by cooling the solution. The hydrogen chloride produced remains in the mother liquor which is recycled to a potassium bisulfate production unit. The production of potassium bisulfate must be about 30 to 50% greater than the required sulfate output and an alternative use must be found for the excess bisulfate.

The second U.S. Pat. No., 4,045,543, describes a method whereby potassium sulfate is produced from sulfuric acid and potassium chloride added to a dilute solution containing $H^+$, $K^+$, $Cl^-$ and $SO_4^{--}$ ions. To remove the hydrogen chloride produced by the reaction, it must be distilled from the solution. Because of the manner in which the process is operated, a very large amount of water must be removed to remove the hydrogen chloride producing a distillate containing only about 5% HCl. Water must be removed from the distillate to concentrate the hydrogen chloride solution sufficiently for subsequent sale or use. A further major quantity of water equal to that removed by distillation is needed to wash the product, said to be potassium sulfate, produced upon cooling the reaction mixture. All in all, about 10 tons of water must be evaporated for each ton of potassium sulfate produced.

SUMMARY OF THE INVENTION

It is an object of this invention to provide a process for the preparation of potassium sulfate from potassium chloride and sulfuric acid.

It is a further object of this invention to provide a process for the preparation of potassium sulfate which does not produce large quantities of excess potassium bisulfate.

It is yet a further object of the present invention to provide a process for producing potassium sulfate which does not require evaporating very large quantities of water.

It is still another object of the present invention to provide a process for producing potassium sulfate which produces a distillate of hydrogen chloride and water having a concentration when condensed in the commercial range of about 30% HCl.

Other objects and advantages of the present invention will become apparent in light of the following description of the invention.

In accordance with the present invention, potassium chloride and sulfuric acid are reacted in a recycled aqueous solution in the stoichiometric ratio required for potassium sulfate production. Hydrogen chloride produced by the reaction of the potassium chloride and sulfuric acid is evaporated in admixture with water or in anhydrous form. The resulting solution is cooled to crystallize a potassium sulfate salt, preferably potassium bisulfate. The potassium sulfate salt is separated from the mother liquor and the mother liquor is recycled to the reaction step. The potassium sulfate salt is dissolved in an aqueous solution and sequentially decomposed to produce potassium sulfate and a mother liquor rich in sulfuric acid. The mother liquor rich in sulfuric acid is evaporated to remove at least a portion of the water and the concentrated mother liquor recycled to the reaction step.

In accordance with one embodiment of the invention, the reaction solution produced by reacting potassium chloride and sulfuric acid is evaporated to remove hydrogen chloride and at least a portion of the water and the vapors are condensed to produce a solution of hydrochloric acid. The resulting solution is cooled to crystallize potassium bisulfate ($KHSO_4$). The potassium bisulfate is separated from the mother liquor which is recycled to the reaction step. The potassium bisulfate is dissolved in a recycled mother liquor from a later step in the process to crystallize a potassium sulfate double salt ($K_3H(SO_4)_2$). The potassium sulfate double salt is separated from its mother liquor and dissolved in an aqueous solution. Potassium sulfate ($K_2SO_4$) is crystallized in the solution and separated from its mother liquor. The separated mother liquor is recycled to dissolve the potassium bisulfate crystals. The mother liquor remaining after crystallizing the potassium sulfate double salt is evaporated to remove at least a portion of the water and the concentrated mother liquor recycled to the reaction step.

DESCRIPTION OF THE PREFERRED EMBODIMENTS

Figure 1:
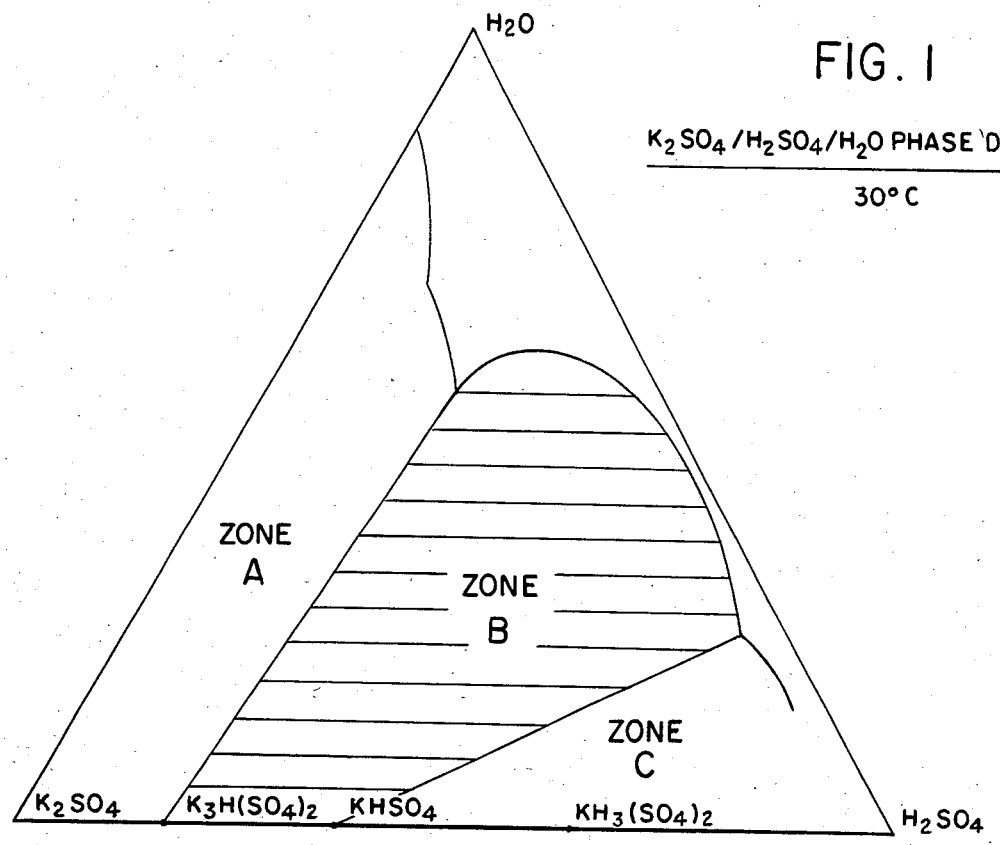
FIGS. 1 and 2 show phase diagrams which illustrate the products formed from a reaction mixture of sulfuric acid and potassium chloride at 30° C. and 50° C., respectively.
Figure 2:
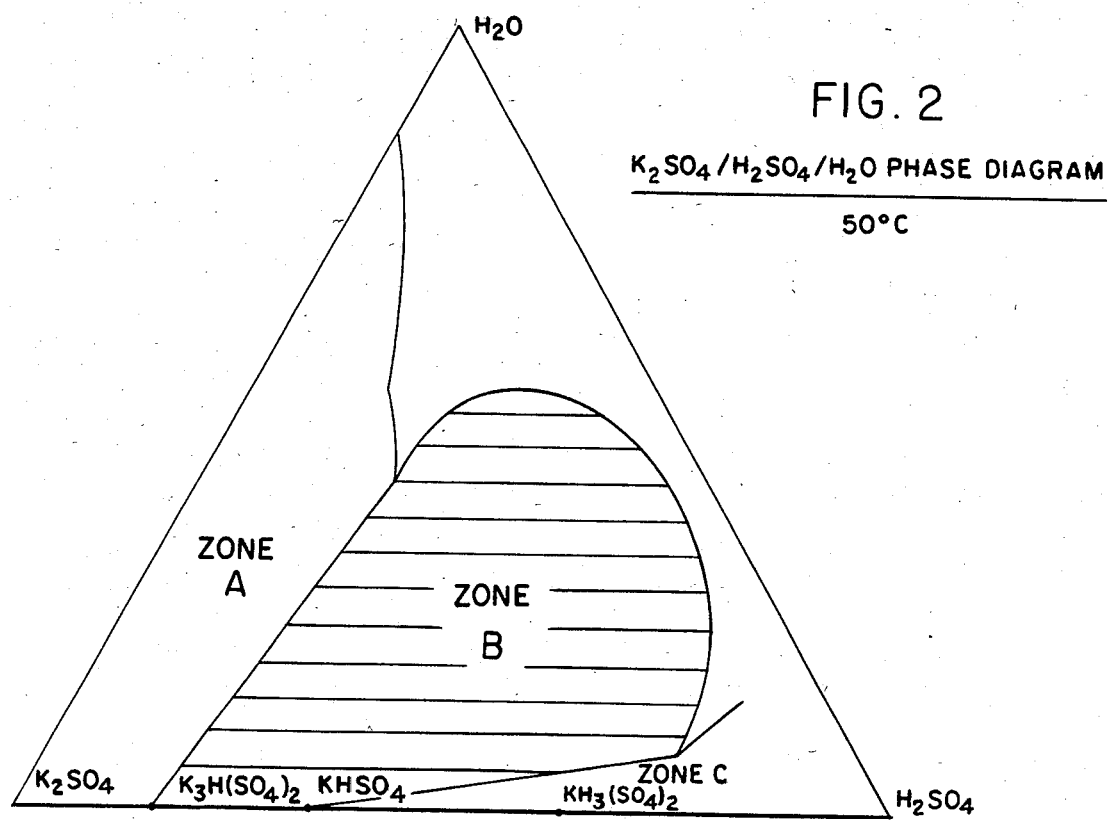
Figure 3:
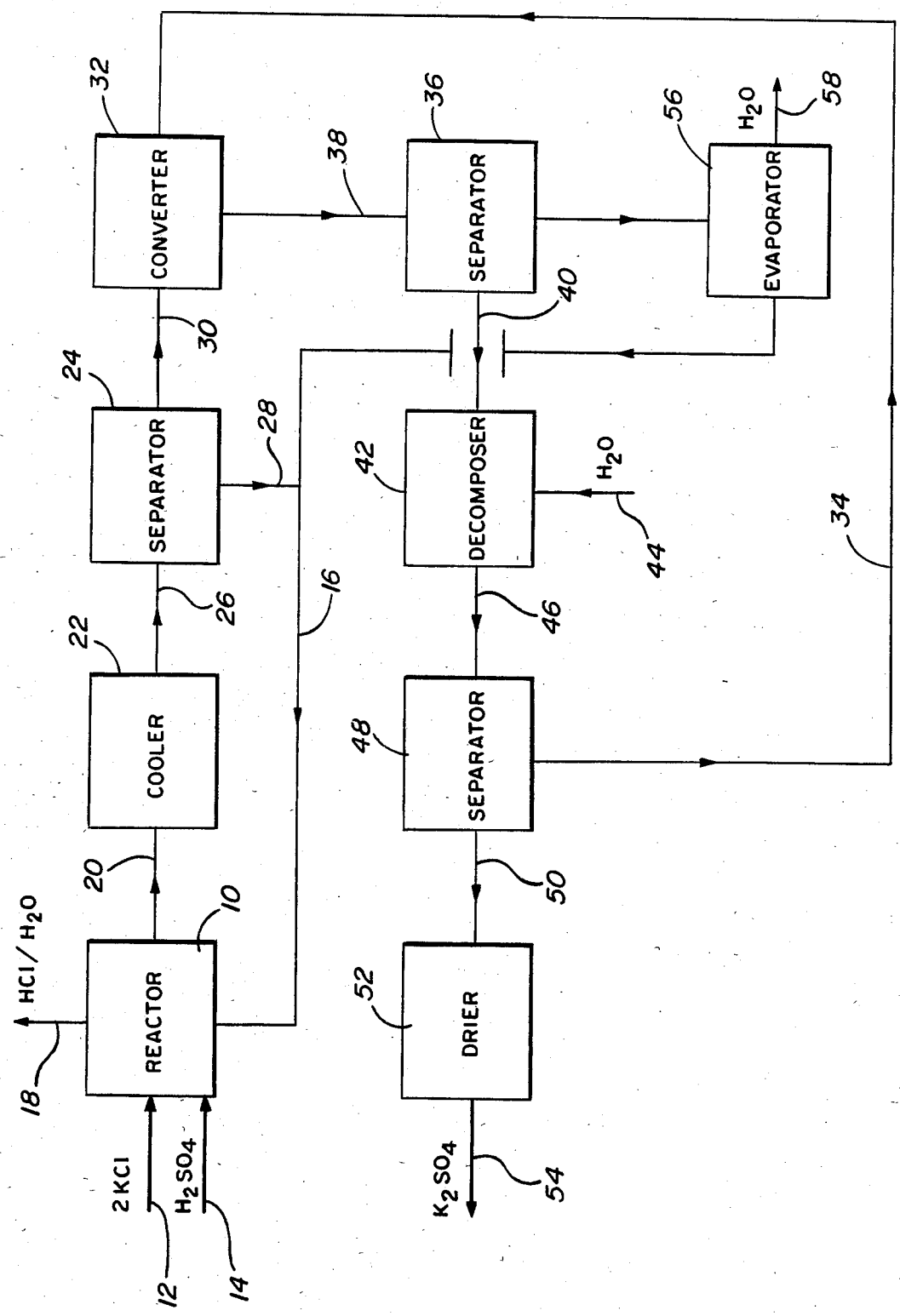
FIG. 3 is a flow diagram of a process of the present invention wherein potassium chloride and sulfuric acid are converted to potassium sulfate by a process in which intermediate potassium bisulfate is produced and sequentially decomposed.

We have found that, dependent upon the ratio of hydrogen ion to potassium ion in the solution, it is possible to crystallize $K_2SO_4$, $K_3H(SO_4)_2$, $KHSO_4$, or $KH_3(SO_4)_2$ from reaction mixtures of sulfuric acid and potassium chloride. The concentration range for each of these products can be determined from the phase diagram in FIGS. 1 and 2. As the acidity of the equilibrium solution increases, the product produced in the reaction mixture changes. Referring to FIGS. 1 and 2, in zone A, $K_2SO_4$ or $K_3H(SO_4)_2$ is the species formed. In zone B, $KHSO_4$ is formed and in zone C the species which is formed is $KH_3(SO_4)_2$ or $KH_3(SO_4)_2 \cdot H_2O$.

In zone A, the hydrogen chloride concentration in the reaction mixture is so low that large quantities of water must be removed in order to remove the HCl produced. This is unattractive from the standpoint of economics and energy conservation.

In zone B, large quantities of water must be removed as in zone A until the hydrogen ion concentration in solution reaches about 0.6 to 0.8 g/100g solution. Above this hydrogen ion concentration range, increasingly concentrated hydrochloric acid solution may be distilled from the reaction mixture to recover the chloride ion added to the reaction mixture in the form of potassium chloride. At concentrations of hydrogen ion greater than about 1 g/100g solution, and in zone C, it is possible to produce anhydrous hydrogen chloride directly from the reaction solution. It should be noted that the partial pressure of hydrogen chloride in the vapor distilling from the reaction mixture decreases as the hydrogen chloride content of the solution decreases and the overall solute content increases. In a batch process, therefore, the initial concentration of the condensing hydrochloric acid will always be higher than that of the final material condensing and indeed of the resultant mixed acid collected.

In accordance with the present invention, a continuous process is provided for the production of potassium sulfate from potassium chloride and sulfuric acid which will operate at temperatures below about 130° C. Although the process will operate throughout zones A, B and C illustrated in the phase diagram of FIGS. 1 and 2, the restraints mentioned above make it uneconomical to operate in zone A, even though the products, $K_2SO_4$ and $K_3H(SO_4)_2$, in this zone require the least recycle of sulfuric acid.

In zone B, a process in which potassium bisulfate is produced as an intermediate reaction product can be readily operated to produce 20° B hydrochloric acid, a common article of commerce. Under these conditions, the recycle of acid to the reaction solution is higher than in zone A, but the recycled acid has a higher concentration. Thus, some evaporation is required before recycle of the solution produced by recrystallization of the intermediate potassium bisulfate to produce potassium sulfate.

In zone C, it is possible to produce anhydrous hydrogen chloride as a by-product but a large recycle of acid is required after crystallization of the potassium sulfate double salt, $KH_3(SO_4)_2$, to $K_2HSO_4$. Since this recycle must be virtually anhydrous, serious materials of construction problems are created for the evaporator and high temperatures and high energy input are needed.

Potassium sulfate produced via zone B or C requires considerably less, 40 to 50% less, evaporation per ton of $K_2SO_4$ produced than is required when potassium sulfate is produced via zone A. Operating in zones B or C, therefore, substantially reduces the large energy penalty required to operate in zone A, as described in U.S. Pat. No. 4,045,543 and thereby allows economical production of potassium sulfate.

In the first stage of the process, potassium chloride and sulfuric acid are reacted in a recycled aqueous solution in the stoichiometric ratio required to produce potassium sulfate. A molar ratio of potassium chloride to sulfuric acid of 2:1 is theoretically required to form potassium sulfate. The reaction solution preferably contains about 0.6 to 1.4 grams, more preferably about 0.75 to 0.85 grams, $H^+$ per 100 grams of solution. The reaction is conducted at a temperature of below about 130° C. dependent upon the hydrogen ion concentration. Hydrogen chloride is continuously removed from the system. Substantially all of the hydrogen chloride generated during the reaction of potassium chloride and sulfuric acid is removed during this stage of the process. Theoretically, about 1 mole of hydrogen chloride is removed for each mole of potassium chloride used as a starting material.

After removal of the HCl, the reaction solution is cooled to about 0° to 50° C. This causes solid potassium sulfate salt to precipitate. As discussed previously, the ratio of the hydrogen ion to the potassium ion of the solution will determine the potassium sulfate salt which is precipitated. The potassium sulfate salt is separated from its mother liquor in a filter, centrifuge, or other suitable device. The mother liquor is recycled to the potassium chloride and sulfuric acid reaction step.

The separated intermediate potassium sulfate salt is decomposed by sequential crystallization to produce potassium sulfate and a mother liquor rich in sulfuric acid. The mother liquor rich in sulfuric acid is evaporated to remove at least a portion of the water. This can be accomplished in a conventional evaporator. The quantity of water removed from the mother liquor in a continuous process is dependent on the quantity of water required to operate the reactor. The concentrated mother liquor rich in sulfuric acid is then recycled to the reactor in which the potassium chloride and sulfuric acid reaction is conducted.

In accordance with one embodiment of the invention, potassium chloride and sulfuric acid at a molar ratio of 2:1 are reacted at a hydrogen ion to potassium ion ratio in the reactor such that potassium bisulfate crystallizes when the reaction mixture is cooled. The reaction solution is evaporated to partially remove water and hydrogen chloride substantially equivalent to the potassium chloride added to the reactor. The $HCl/H_2O$ vapors are condensed to produce a solution of hydrochloric acid. The concentration of the solution of hydrochloric acid is preferably greater than about 30% HCl w/w, more preferably between about 30 and 33% HCl w/w. The concentration of the condensed solution can be controlled by controlling the rate of evaporation. The rate of evaporation is controlled by raising or lowering the heat input to the reaction solution.

The reaction solution is cooled to crystallize potassium bisulfate ($KHSO_4$) and the potassium bisulfate is separated in a filter, centrifuge or the like. The resulting mother liquor is recycled to the reactor and the potassium bisulfate decomposed using recycled mother liquor from a subsequent step at a temperature of about 0° to 25° C. This causes the potassium sulfate double salt ($K_3HSO_4$) to crystallize.

The crystallized $K_3HSO_4$ is separated from its mother liquor which is rich in sulfuric acid and decomposed using an aqueous solution, typically water, at a temperature of about 0° to 25° C. This causes potassium sulfate ($K_2SO_4$) to crystallize from the solution. The crystallized potassium sulfate is separated from the solution and dried in a conventional drier.

The mother liquor remaining after the crystallized $K_2SO_4$ is separated is recycled and used to decompose potassium bisulfate. The mother liquor rich in sulfuric acid remaining after the crystallized $K_3HSO_4$ is separated is evaporated to remove at least a portion of the water content. The concentrated mother liquor is then recycled to the reactor as described previously.

Referring now to FIG. 2, a flow sheet is shown for the preparation of potassium sulfate from potassium chloride and sulfuric acid with the intermediate formation and isolation of potassium bisulfate. Potassium chloride and sulfuric acid in a molar ratio of 2:1 are continuously fed to a reactor 10 via lines 12 and 14, respectively. Also fed to the reactor via line 16 is a recycled aqueous solution. The reactor is maintained at a suitable temperature, typically about 130° C., and hydrogen chloride and water vapor are removed continuously via line 18 at a rate such that condensed liquid has an HCl content most preferably of about 32% w/w. The resulting solution is fed via line 20 to a cooler 22 where the temperature is dropped to a suitable level (e.g., 25° C.) to form a slurry containing solid potassium bisulfate ($KHSO_4$). The slurry is fed to a separator 24 via line 26. The separator may be a filter, centrifuge or other suitable device. The mother liquor from the separator is recycled to the reactor 10 via lines 28 and 16. Potassium bisulfate separated in the separator is fed via line 30 to a converter 32. In the converter 32, potassium bisulfate is decomposed, typically at about 20° C., using a recycled aqueous solution fed to the separator 32 via line 34. The resulting slurry is fed to a separator 36 via line 38. The separator 36 is a filter, centrifuge or the like. In the separator 36, solid $K_3H(SO_4)_2$ is separated from its mother liquor. The solid $K_3H(SO_4)_2$ separated in the separator 36 is fed via line 40 to a decomposer 42. In the decomposer 42, the solid $K_3H(SO_4)_2$ is slurried at a temperature of about 20° C. with water supplied via line 44. The $K_3H(SO_4)_2$ decomposes to yield potassium sulfate ($K_2SO_4$) and a solution of potassium bisulfate ($KHSO_4$) in water. The slurry is fed via line 46 to a separator 48. The solid potassium sulfate separated in the separator 48 is fed via line 50 to a drier 52 to produce high quality potassium sulfate removed from the system via line 54. The mother liquor produced in separator 48 is fed via line 34 to converter 32. The mother liquor produced in separator 36 is fed to evaporator 56 where water is removed via line 58 preferably at a rate equal to that fed to decomposer 42. In fact, the condensate from evaporator 56 can be fed to the decomposer 42 if desired.

The following non-limiting examples further illustrate the invention:

EXAMPLE 1

This example illustrates the production of potassium bisulfate concentrations in zone B of the phase diagram shown in FIG. 1. Hydrochloric acid and water distilled batchwise at reaction conditions is of varying composition.

Potassium bisulfate was prepared by adding, at room temperature, 37.3 grams potassium chloride and 50.5 grams sulfuric acid (97%) to 355 grams of a recycle solution from a previous batch containing 4.5% potassium, 17.1% sulfate and 10.7% chloride ion concentration. The temperature was raised to a level to allow distillation of hydrogen chloride and water vapor at a temperature of about 125° C. The distillate was collected and analyzed for hydrochloric acid concentration after 28.4, 56.2 and 94.4 grams of distillate were collected. The hydrochloric acid concentration of the three distillates were 36.2%, 26.6% and 22.0%, respectively. The average composition of the 94.4 grams of distillate was 29.2% HCl. Prior to potassium bilsulfate crystallization, 25.7 grams of the distillate and 50.2 grams of water were returned to the reactor. These returns represent replacement of the excess hydrochloric acid removed from the reaction solution and replacement of the water removed from the reaction solution.

The reaction mixture was cooled to room temperature (about 20° C.). The mixture was filtered and the solids sequentially washed with water and methanol. The washed product was dried and yielded 54.6 grams of potassium bisulfate containing 28.9% potassium; 69.7% sulfate and 0.0% chloride ($KHSO_4$ requires K, 28.7%; $SO_4$, 70.6%).

EXAMPLE 2

This example shows that potassium bisulfate and anhydrous hydrogen chloride can also be produced in zone B of the phase diagrams in FIGS. 1 and 2.

A reaction solution was prepared by mixing, at room temperature, 144.5 grams water, 356 grams sulfuric acid, 15 grams potassium sulfate and 39.5 grams concentrated hydrochloric acid (38%). Potassium bisulfate was prepared by slowly adding 37.3 grams potassium chloride to the above mixture. The reaction mixture was heated to 80° C. and held for one hour. Hydrogen chloride was liberated over the entire temperature range of 20° C. to 80° C. The solution cleared at about 70° C. The solution was cooled to 20° C. and filtered and the solids washed and dried. The dried product weighed 68 grams (100% yield) and contained 27.8% potassium, 68.5% sulfate and 0.0% chloride ($KHSO_4$ required K, 28.7%; $SO_4$, 70.6%). The filtrate was subsequently cooled to 0° C. and filtered. The solids precipitated at 0° C. were washed and dried. This dried product weighed 13.4 grams and contained 27.4% potassium, 65.9% sulfate and 0.0% chloride. The second filtrate (524.4 grams) contained 68.2% sulfuric acid, 67.8% sulfate, 0.6% chloride and 0.0% potassium.

EXAMPLE 3

This example demonstrates that the potassium bisulfate, sulfuric acid double salt, $KH_3(SO_4)_2H_2O$, is produced in zone C of the phase diagrams of FIGS. 1 and 2.

A reaction solution was prepared by combining 25.4 grams water, 288.8 grams sulfuric acid (97%), and 33.8 grams potassium sulfate. The resulting solution was cooled to room temperature. To this solution, 37.3 grams of potassium chloride was added very slowly. Hydrogen chloride was evolved upon each addition. After all the potassium chloride was added, the temperature of the mixture was raised to 70° C. at which time the solution cleared and hydrogen chloride evolution ceased. The solution was cooled to 50° C., allowed to crystallize, then filtered. The wet solids weighed 124.9 grams (97% yield) and contained 14.0% potassium, 76.6% sulfate and 0.0% chloride ($KH_3(SO_4)_2H_2O$ requires $K_2$, 15.5%; $SO_4$, 76.2%). The filtrate weighed 196.3 grams and contained 4.4% potassium, 78.0% sulfate, 76.6% sulfuric acid and approximately 0.1% chloride ion.

EXAMPLE 4

This example shows that potassium bisulfate can be decomposed to the potassium sulfate-potassium bisulfate double salt with an aqueous bisulfate solution at 0° C.

A synthetic filtrate solution from potassium sulfate crystallization at 18° C. was prepared by mixing 1462 grams water, 211 grams sulfuric acid and 362 grams potassium sulfate. The solution temperature was maintained at about 50° C. To this solution was added 768 grams of KHSO$_4$ produced from a previous run. The mixture was filtered at 50° C. The solids were dried and weighed 534.2 grams. The solids contained 36.3% potassium, and 63.7% sulfate. The filtrate was subsequently cooled at 0° C. and filtered. These solids weighed 256 grams and contained 36.2% potassium and 63.8% sulfate (K$_3$H(SO$_4$)$_2$ requires K, 37.8%; SO$_4$, 61.9%). The filtrate recovered after the crystallization at 0° C. weighed 1953.3 grams and contained 5.2% K, 22.4% sulfate and 0.1% chloride. This filtrate was used to prepare concentrate for Examples 6 and 7.

EXAMPLE 5

This example shows that potassium sulfate-potassium bisulfate double salt can be decomposed with water to yield potassium sulfate and an aqueous bisulfate solution.

Potassium sulfate was prepared by adding 779.5 grams of the potassium sulfate-potassium bisulfate double salt to 886 grams water. This mixture was maintained at 18° C. for one hour. The mixture was filtered and the solids were washed and dried. The washed product weighed 428.5 grams (97% yield) and contained 44.2% potassium, 55.2% sulfate and 0.0% chloride (K$_2$SO$_4$ required K, 44.8%; SO$_4$, 55.2%). The filtrate weighed 1193 grams and contained 7.2% potassium, 18.7% sulfate, 10.9% sulfuric acid and 0.0% chloride ion.

EXAMPLE 6

This example demonstrates the ability to recycle filtrate from the decomposition of potassium bisulfate. It also shows that the hydrochloric acid overheads can be collected at a concentration of 32%.

342.3 grams of the bisulfate-sulfuric acid filtrate described in Example 4 was distilled and 199.3 grams water was collected. The concentrate (143 grams) was mixed with 598 grams of recycled filtrate solution whose composition was about 1.2% potassium, 25.7 sulfate and 8.5% chloride ion. To the above mixture was added 24.5 grams sulfuric acid (97%) and 37.3 grams potassium chloride. This mixture was heated to about 120° to 130° C. resulting in a vapor with a vapor temperature of about 107° C. 65.2 grams of distillate was collected and contained 31.45% hydrochloric acid. The excess hydrochloric acid distillate (6.9 grams) was returned to the bottoms and the solution was cooled to about 20° C. This mixture was filtered and the solids washed sequentially with water and methanol and dried. The potassium bisulfate solids weighed 125.9 grams and contained 29.2% potassium, 69.5% sulfate and 0.0% chloride (KHSO$_4$ requires K, 28.7%; SO$_4$, 70.6%). The filtrate solution weighed 576.9 grams and contained 1.16% potassium, 25.7% sulfate and 8.5% chloride.

EXAMPLE 7

This example also demonstrates the ability to recycle filtrate from the decomposition of potassium bisulfate and collect by-product hydrochloric acid at a commercial concentration (approximately 32%). In addition, it shows that commercial grade potassium chloride can be used as the potassium source.

Again, 342.3 grams of the filtrate from the potassium bisulfate decomposition in Example 4 was distilled until 199.3 grams of water was collected. The bottoms, about 143 grams, was mixed with 598 grams of recycled solution from a previous run. To this mixture was added 24.5 grams sulfuric acid and 38.1 grams of commercial grade potassium chloride containing 98%. This mixture was reacted at about 120° C. to 130° C. until 77.3 grams of distillate was collected. The hydrochloric acid concentration in the distillate assayed 30.9%. 17.8 grams of the distillate was returned to the bottoms and the solution cooled to about 20° C. This mixture was filtered. The solids were washed sequentially with water and methanol and dried. The dried solids weighed about 109.4 grams and contained 30.6% potassium, 68.9% sulfate and less than 0.1% chloride (KHSO$_4$ requires K, 28.7%; SO$_4$, 70.6%). The filtrate weighed 581.1 grams and contained 1.5% potassium, 27.0% sulfate and 8.2% chloride.

As will be readily understood by those of ordinary skill in the art, modifications may be made in the method described above without departing from the spirit and scope of the invention. Accordingly, it should be understood that the invention is not to be limited to the exact details disclosed herein, but only as defined in accordance with the appended claims.

We claim:

1. A process for the preparation of potassium sulfate, comprising:
   (1) feeding potassium chloride and sulfuric acid in substantially the stoichiometric ratio to produce potassium sulfate into a recycled aqueous solution containing K$^+$, H$^+$ and sulfate and bisulfate ions;
   (2) evaporating substantially all of the hydrogen chloride produced in step (1) along with water and condensing the hydrogen chloride and water mixture to form a solution having a concentration greater than about 30% HCl w/w;
   (3) cooling the solution resulting from step (2) to crystallize KHSO$_4$ or a double salt of potassium sulfate and sulfuric acid;
   (4) separating said KHSO$_4$ or double salt to form a first mother liquor and recycling said first mother liquor to step (1);
   (5) dissolving said KHSO$_4$ or double salt in water or an aqueous solution containing K$^+$, H$^+$ and sulfate and bisulfate ions and sequentially decomposing said KHSO$_4$ or double salt to form potassium sulfate and a second mother liquor rich in sulfuric acid and separating said potassium sulfate from said second mother liquor;
   (6) evaporating said second mother liquor to remove at least a portion of said water; and
   (7) recycling said concentrated second mother liquor to step (1).

2. The process of claim 1 in which said sequential decomposition in step (5) comprises crystallizing a double salt of potassium sulfate and sulfuric acid, separating said double salt to form said second mother liquor, dissolving said double salt in an aqueous solution to crystallize potassium sulfate, separating said potassium sulfate to form a third mother liquor, and recycling said third mother liquor to step (5).

3. The process of claim 1 in which the quantity in moles of hydrogen chloride evaporated in step (2) is substantially the same as the quantity in moles of potassium chloride reacted in step (1).

4. The process of claim 1 in which said solution of step (2) has a concentration of about 30 to 33% HCl w/w.

5. A process for the preparation of potassium sulfate, comprising:
  (1) feeding potassium chloride and sulfuric acid in the stoichiometric ratio required to produce potassium sulfate into an aqueous solution recycled from steps (4) and (10);
  (2) evaporating the reaction solution from step (1) to remove hydrogen chloride and a portion of the water and condensing the vapor to produce a solution of hydrochloric acid having a concentration greater than about 30% HCl w/w;
  (3) cooling the solution resulting from step (2) to crystallize $KHSO_4$;
  (4) separating said $KHSO_4$ to form a first mother liquor and recycling said first mother liquor to step (1);
  (5) dissolving said $KHSO_4$ separated in step (4) in an aqueous solution recycled from step (8);
  (6) crystallizing $K_3HSO_4$ from said solution resulting from step (5) to form a second mother liquor;
  (7) dissolving said $K_3HSO_4$ in an aqueous solution recycled from step (11);
  (8) crystallizing and separating $K_2SO_4$ from said solution resulting from step (7) to form a third mother liquor and recycling said third mother liquor to step (5);
  (9) evaporating said second mother liquor to remove at least a portion of the water substantially equal in quantity to the quantity added in step (7);
  (10) recycling said concentrated second mother liquor resulting from step (9) to step (1); and
  (11) washing said separated $K_2SO_4$ and recycling the washings to step (7).

6. The process of claim 5 in which said reaction solution in step (1) contains about 0.6 to 1.4 grams $H^+$ per 100 grams solution.

7. The process according to claim 5 wherein said potassium chloride and sulfuric acid are reacted in step (1) at a temperature sufficient to maintain the $KHSO_4$ in solution.

8. The process of claim 7 in which said temperature is the boiling point of the solution.

9. The process of claim 5 in which in step (3) the solution is cooled to a temperature below about 55° C.

10. The process of claim 9 in which said solution is cooled to about ambient temperature.

* * * * *